TELEVISION SYSTEM

Filed Oct. 3, 1947 2 Sheets-Sheet 1

INVENTORS
GEORGE C. SZIKLAI
& ALFRED C. SCHROEDER
BY [signature]
ATTORNEY

INVENTORS
GEORGE C. SZIKLAI
& ALFRED C. SCHROEDER
BY [signature]
ATTORNEY

Patented Aug. 8, 1950 2,518,200

UNITED STATES PATENT OFFICE 2,518,200

TELEVISION SYSTEM

George C. Sziklai, Princeton, N. J., and Alfred C. Schroeder, Feasterville, Pa., assignors to Radio Corporation of America, a corporation of Delaware Application October 3, 1947, Serial No. 777,750

14 Claims. (Cl. 250—164)

This invention relates to color television and more particularly to image pickup and image reproduction devices for the transfer of images in substantially their natural color.

It is well established and quite well known that the transmission of images by electricity can be accomplished by analyzing the image into its image elements and deriving therefrom a signal train of impulses by a predetermined orderly sequence of scanning. The image may then be reproduced at a remote location by a repetition of the same sequence of scanning.

It is also well known to the printing art and the like that images in their natural color may be reproduced by what are known as additive methods, that is, by breaking down the light from an object into several selected primary or component colors.

It therefore follows that color images may be electrically transmitted by analyzing the light from the object or image into not only its image elements but also analyzing the light from elemental areas of the object into selected primary or component colors and deriving therefrom a signal train of impulses representative of each of the several selected component colors. The color image may then be reproduced at a remote location by appropriate reconstruction from the several component color signal trains.

It has been proposed to transmit sequentially signal trains representative of the different color components of an object. This has become known as the sequential method.

The television camera is employed for converting light from an object into a signal train. In the transmission of images by the sequential method, the camera may have a single image pickup tube such as, for example, the so-called image orthicon, which is exposed in succession to images giving color separation corresponding to the various selected component colors. During the period that the camera tube is exposed to each color component image, the mosaic is concurrently scanned to enable the transmission of signals representing the corresponding color separation image.

In the conventional sequential multicolor television receiver, a kinescope or other image producing tube is employed to recreate a black and white image likeness which is viewed and projected through a color filter of the selected component color corresponding to the component color instantaneously being represented. The process is then repeated for the next selected color component, and so on.

A typical sequential color television system is shown and described in an article entitled, "An Experimental Color Television System" by R. D. Kell, G. L. Fredendall, A. C. Schroeder, and R. C. Webb, beginning on page 141 of the "RCA Review" for June, 1946.

Although color images have been reproduced by the aforementioned sequential method, there are certain fundamental difficulties involved which tend to reduce the entertainment value of the sequential system. Typical difficulties involved include color action fringes resulting from movement between individual component color scannings. Low light image intensity at the television pickup tube is due to the inefficiency of the auxiliary mechanically rotated color filter system. Furthermore, the use of mechanically rotated filters adds to the complication, maintenance and bulkiness of the equipment, both at the transmitter and receiver.

The fundamental difficulties referred to above and others are eliminated in the practice of this invention.

According to this invention, an electron beam target is employed having a rough surface and including a multiplicity of beam impact areas that are discriminative to different selected component colors, depending upon the direction of approach by the associated electron beam. In addition to normal scanning deflection, the electron beam is bent to intercept the target from a predetermined angle, depending upon the color response desired. The invention is applicable to both transmitting and receiving tubes.

A primary object of the invention is to provide an improved television system.

Another object of this invention is to provide for changing color representations by electronic devices.

Still another object of this invention is to permit rapid change in color representation such as is required in line sequential and elemental sequential procedures.

Other and incidental objects of the invention will be apparent to those skilled in the art from a reading of the following specification and an inspection of the accompanying drawing in which Figure 1 shows by block and circuit diagram one form of this invention adapted for image reproduction;

Figure 1:
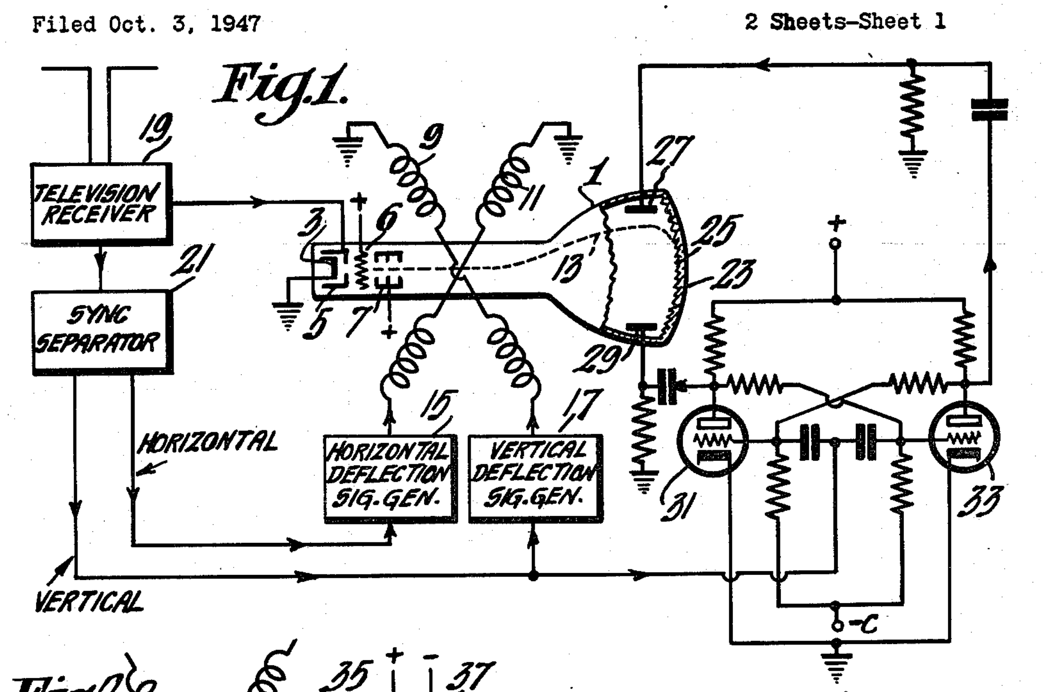

Turning now in more detail to Figure 1, there is shown an image reproducing tube 1 having an associated electron beam gun including a cathode 3, a control electrode 5 and accelerating electrodes 6 and 7. Any suitable electron beam forming arrangement may be employed in the practice of this invention, and a detailed description thereof is not given here, but may be found in literature such as, for example, in an article entitled, "Improved Electron Gun For Cathode Ray Tubes" by L. E. Swedlund in "Electronics" for March, 1946.

Electron beam deflection coils 9 and 11 are employed for deflecting the electron beam 13 in accordance with a predetermined scanning raster, as is well known in the television art.

Although deflecting coils 9 and 11 are shown to provide for electromagnetic deflection, electrostatic deflection plates may be employed in the practice of this invention.

Deflection coils 9 and 11 obtain their electrical energy through horizontal deflection signal generator 15 and vertical deflection signal generator 17. The necessary synchronization between transmitting and receiving scanning operations is obtained from the television receiver 19 through the sync separator 21. Like the electron gun referred to above, circuit arrangements and their operation for the reception of composite television signals, together with sync separation and deflection signal generation, are quite well known in the television art and may be found in various forms of brief reference to current literature on the subject.

Tube 1 employs a target which, in the receiving type tube, may take the form of a Phosphor screen 23.

Popular kinescopes such as shown and described in the television art ("Description of an Experimental Television System and Kinescope" by Dr. V. K. Zworykin in the "Proceeding of the Institute of Radio Engineers" for December, 1933) employ a screen with a relatively smooth surface upon which the associated electron beam is adapted to impact substantially perpendicular thereto. In accordance with the popular kinescopes, however, the direct light reproduction is limited to a single color.

It will be possible, however, by employing a target in accordance with the practice of this invention to reproduce light in a plurality of colors. It is also possible in the practice of this invention to change one color to another at an extremely rapid rate. This is accomplished by providing screen 23 with a rough or irregular surface 25, illustrated enlarged.

It follows that if the upper surfaces are coated with, for example, a red light producing phosphor, or white light producing phosphor with closely adjacent elemental size color filters, while the bottom surfaces are coated with a green light producing phosphor, the light produced by the screen 23 will depend upon the direction of approach of the electron beam 13. When the path of the electron beam is bent downward, a red light will be produced, while if the electron beam 13 is bent in an upward direction, only the bottom surfaces of the elements 25 will be intercepted by the beam, and therefore a green light will be produced. This particular portion of the invention will be described in detail later.

Although there are a number of methods and means for bending the electron beam, such as, for example, by electrostatic deflection or by electromagnetic deflection, in the form of the invention shown in Figure 1 there is illustrated electrostatic plates 27 and 29 positioned adjacent the edges of the screen 23 and having impressed thereon an alternately positive and negative potential. This alternating potential may be obtained, as illustrated by circuit diagram, from an Eccles-Jordan circuit arrangement including tubes 31 and 33. The operation of an Eccles-Jordan or multivibrator circuit in the production of alternating voltages is quite well known in the art and needs no detailed description here except perhaps to refer to a well described arrangement thereof which may be found on page 171 of the book entitled, "Ultra High Frequency Techniques" by Brainerd, Koehler, Reich and Woodruff, published by D. Van Nostrand Co., Inc., in 1942.

The multivibrator circuit involving tubes 31 and 33 must necessarily be driven in synchronism with the transmitting station and may, for example, obtain its synchronization through the vertical deflection synchronizing pulse, as illustrated in Figure 1. The multivibrator involving tubes 31 and 33 may, for example, also obtain its synchronism by an auxiliary synchronizing signal or, for convenient purposes and perhaps to provide line sequential operation, may obtain its synchronization through the horizontal synchronizing pulse obtained in sync separator 21.

Any non-uniformity in the field between deflecting plates 27 and 29 which may cause the electron beam 13 to be deflected to a larger extent closer to the edges than in the center may be compensated for by periodically changing the amplitude of the deflecting voltage.

It follows, therefore, that when the beam bending arrangements at the transmitter and receiver are driven in synchronism, the particular component color represented by the signal obtained through the television receiver 19 may be reproduced by the electron beam impacting the proper selected portion of the surface of the screen 23.

Figure 2:
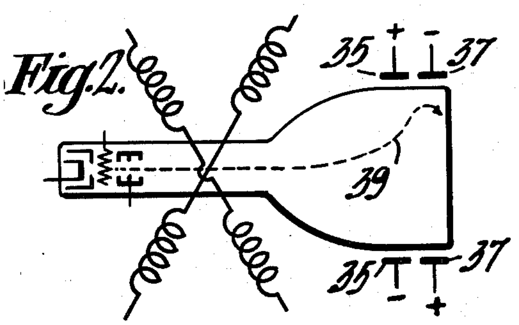
Figure 2 illustrates by schematic diagram still another form of this invention involving a double "bend" of the electron beam.

Turning now to Figure 2, there is shown another form of this invention employing a "double bend."

It will be seen by an examination of the form of the invention shown in Figure 1 that registration of different colored images will have to be appropriately adjusted to coincide with the registration at the transmitting system. This is particularly true when a receiving system is employed in accordance with this invention, and a transmitting system is employed in accordance with the prior art. It is possible to arrange for compensated deflection of the electron beam 13 of Figure 1 to provide adjustment in registration resulting from the bending of the beam under the influence of electrodes 27 and 29. This signal for compensating the deflection may, for example, be inserted in either the horizontal deflection signal generator 15 or the vertical deflection signal generator 17. Another possible arrangement for compensation in the bending of the beam 13 might take the form of an auxiliary deflection coil or auxiliary deflection electrodes located adjacent the deflection coils 9 and 11.

In accordance with another form of this invention, there are positioned two pairs of deflection elements 35 and 37 shown in Figure 2. As illustrated, the pair of deflecting elements 35 will receive a charging potential 180° out of phase with the deflecting elements 37, thus to cause a double bend in the electron beam 39.

Figures 3, 5:
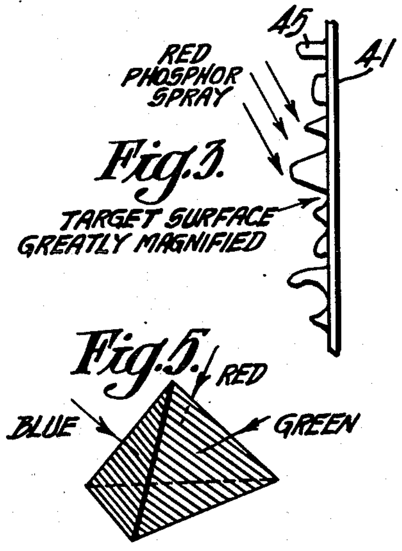
Figure 3 illustrates schematically one form of target, together with one method of preparation thereof.
Figure 5 illustrates schematically an elementary size element on the surface of the target enlarged to show the employment of this invention with three selected component colors.

Turning now to Figure 3, there is shown an enlarged view of a target, in accordance with another form of this invention, wherein the surface of the target 41 is rough or irregular and consists of irregular shaped elementary size elements 45, which may take any of a number of different forms. In the preparation of the target 41, the surfaces of elements 45 may be supplied or coated with appropriate color phosphors, depending upon the direction in which the surfaces face, which directions will correspond to the direction of approach of the electron beam.

Figure 4:
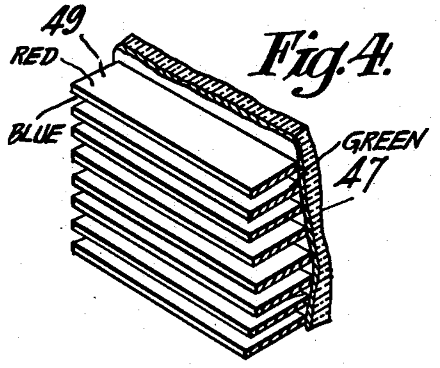
Figure 4 illustrates schematically an enlarged view of another form of the target employed in image reproduction.

Turning now to Figure 4, there is illustrated an enlarged portion of a target applicable to the practice of one form of this invention. The target 47 contains a "shelf-like" series of protruding elements 49 whose upper surfaces are representative of red light, the lower surfaces representative of blue light, and the flat surfaces of target 47 may be representative of green light. It has heretofore been proposed to employ a target of somewhat this nature in a television system employing a plurality of electron beams.

It will be seen that if the electron beam impacts the target 47 from even a small angle below horizontal, only the blue representative surfaces of elements 49 will be intercepted. If, however, the beam impacts the target 47 from an angle above horizontal, only the red representative surfaces will be intercepted. A two-color system will then result, depending upon the direction of approach of the electron beam to the target 47, however, if, in addition, the flat surface of target 47 is green representative and the electron beam is not bent but proceeds substantially normal to target 47, it will strike only the green representative surface. This will provide for a third color representation.

Turning now to Figure 5, there is shown still another form of elementary size elements which may take, as illustrated, the form of a pyramid having three surfaces exposed to impact by the associated electron beam, these three surfaces being capable of producing light corresponding to the several selected component colors, such as, for example, red, blue and green.

It follows that employment of a pyramidal shaped elementary size element, such as illustrated in Figure 5, will necessitate an arrival of the electron beam at the surface area in three selected directions spaced substantially 120° apart. It will be obvious that the approach of the electron beam substantially perpendicular to the green surfaces, for example, will be totally intercepted by the green surfaces and substantially no spill-over will follow on the blue or red surfaces, thus providing an undiluted color representation.

Figures 6, 7, 8, 9:
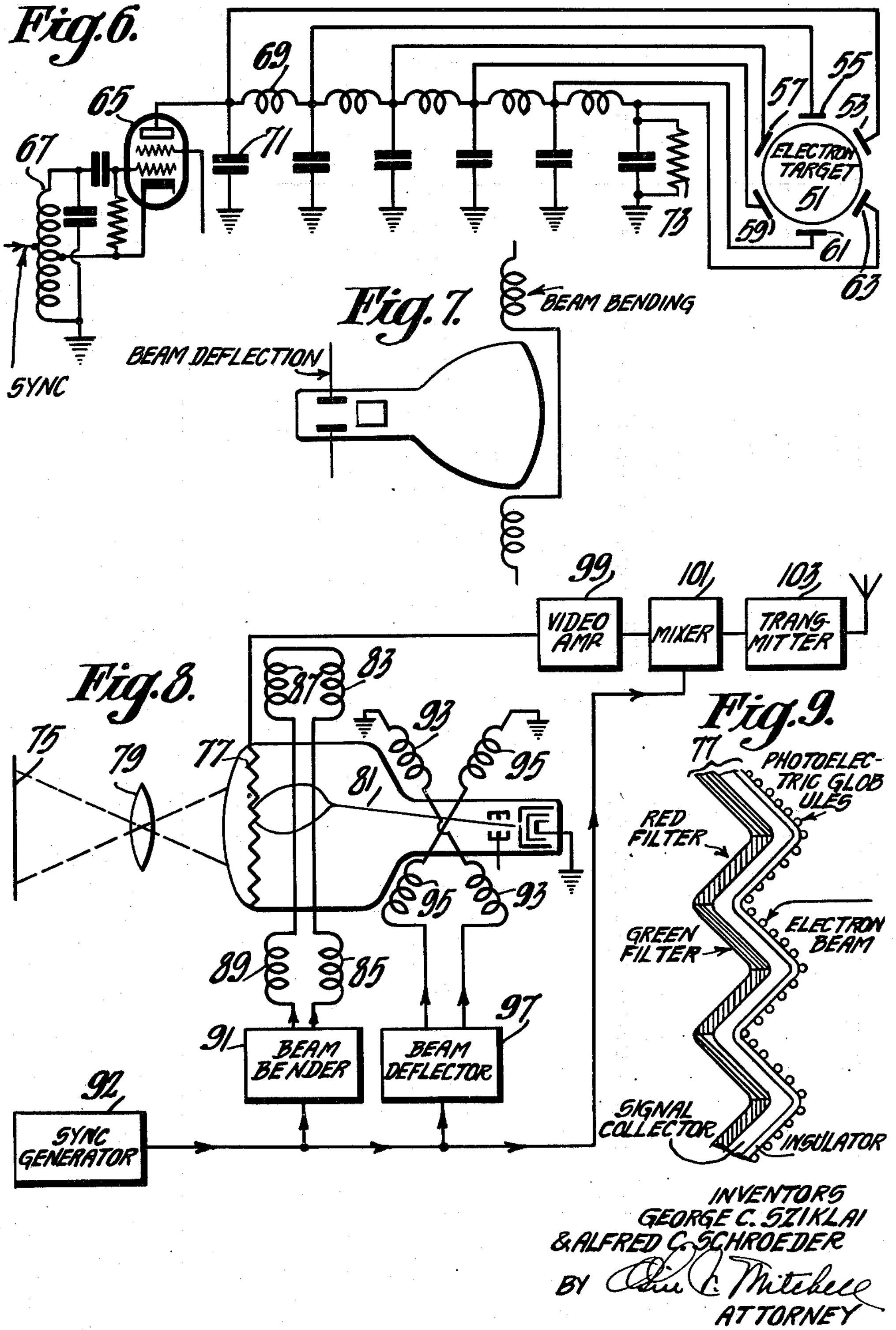
Figure 6 shows by circuit diagram a deflection arrangement for employment in one form of this invention.
Figure 7 shows another form of beam deflection and beam bending arrangement which may be employed in any form of this invention.
Figure 8 illustrates by block diagram the employment of this invention in connection with a television transmitting system.
Figure 9 shows a greatly enlarged view of the target of a transmitting tube suitable for employment in the practice of this invention.

Turning now to Figure 6, there is illustrated one form of circuit arrangement for providing and selecting 120° directional approach to the target. An electron target 51 (which may, for example, be the face of the kinescope) contains electrodes 53, 55, 57, 59, 61 and 63 spaced, as indicated, at 60° from each other.

In order to maintain exact synchronism of the color sequence between the transmitter and the receiver, a locked-in oscillator is provided which may be synchronized in accordance with any of the well-known methods and may consist of tube 65 having an associated oscillatory circuit 67. It will be seen that the type circuit selected is of the electron coupled oscillator arrangement providing in the anode circuit of tube 65 a delay line consisting of inductance 69 and capacitances 71, together with a terminal resistance 73.

Electrodes 53 to 63 inclusive are connected to points of inductance 69 in such a manner as to provide a 60° phase difference between the energy furnished to each of the electrodes 53 to 63. It will be seen that the potential applied to electrode 53 is 180° out of phase with the potential applied to electrode 59, likewise the potential applied to electrode 55 is also 180° out of phase with the electrode applied to potential 61. For the purpose of illustration, synchronization of the circuit arrangement shown in Figure 6 with the beam bending arrangement at the transmitter is provided by an application of an appropriate synchronizing signal to a portion of the oscillator coil 67.

Turning now to Figure 7, there is shown an alternative arrangement for beam deflection and beam bending. In the previous illustrations, electrostatic beam bending was employed while electromagnetic beam deflection was used. As illustrated in Figure 7, beam deflection employed for scanning of the target may be electrostatic, while the beam bending may, for example, be magnetic.

Turning now to Figure 8, there is shown the practice of this invention in a television transmission system. Each of the arrangements shown in previous figures may be adopted for image pickup, but for the purpose of illustration and explanation, a target of the type shown in Figure 1 will be used in Figure 8, together with a magnetic beam bending arrangement employing the double bend form of this invention.

An image of an object 75, which may, of course, take the form of a three dimensional subject or a film picture, is focused on the target 77 by lens 79 in a well known manner.

The scanning beam 81 is bent in two directions by beam bending coils 83, 85, 87 and 89. Coils 83 and 87 are polarized 180° out of phase with each other and likewise coils 85 and 89 are polarized 180° out of phase with each other. A "beam bender" 91 may consist, for example, of an Eccles-Jordan multivibrator circuit, as illustrated in detail in Figure 1, or may consist, for example, of a sine wave generator to provide for a circular trace of the electron beam 81 around an elementary size element of the type, for example, illustrated as a pyramid in Figure 5. The beam bender 91 is synchronized by the associated synchronizing signal generator 92 which is employed at television transmitting stations for synchronizing scanning operation. The scanning of the electron beam 81 is obtained by deflection coils 93 and 95 through beam deflector 97 which may, of course, take any of the well known forms of scanning signal generators.

A video amplifier 99 is connected to the target 77 in a manner well known to the art. The theory and operation of deriving a signal from target 77 is not unlike the theory of operation of the popular iconoscope type of image pickup tube. The theory and operation of the iconoscope is shown and described in the article entitled, "Theory and Performance of the Iconoscope" by V. K. Zworykin, G. A. Morton and L. E. Flory, beginning on page 1071 of the "Proceedings of the Institute of Radio Engineers" for August, 1937. The signal from the video amplifier 99 is combined with the scanning synchronizing signal from sync generator 92 in mixer 101. The composite signal is then utilized in any desired manner such as to modulate the radio frequency transmitter 103.

An enlarged view of target 77 is shown in Figure 9.

Image pickup tube targets of the storage type consist of a flat conductive surface covered by an insulating material which contains thereon a mosaic of photoelectric globules.

The target electrode 77 is arranged with an irregular surface which may take, for example, a sawtooth form in cross section, as illustrated in Figure 9. In addition, there are provided appropriate color filters, as illustrated, for example, red and green. One set of surfaces of the target 77 is provided with red filters, while another set of surfaces is provided with green filters. It will be seen that an electron beam approaching the said one set of surfaces, as illustrated, will provide electrical energy representative of the red component of light energy falling on the target 77. Likewise, an electron beam bent to intercept only the said another set of surfaces of the target 77 will produce electrical energy at the signal collector representative of the green component of the light impinging on the target 77. It will be remembered that the portion of the target 77 shown in Figure 9 is greatly enlarged so that the difference in area occupied by the red and green filter respectively will not be discernible to the unaided human eye. A color will therefore appear in the receiver as a result of the energies received from both the scanning of the area opposite the green filter and the area opposite the red filter. The color in the receiver will be either one or the other or a combination, in accordance with the color of the light falling upon the target 77 at the transmitter.

It will be seen that the irregularities of the targets may be so arranged as desired in a regular pattern to provide for a predetermined timing sequence of selected component colors. Furthermore, the bending of the electron beam may also be synchronized at either elemental frequency, line frequency, frame frequency, or any other desired frequency by the selection of appropriate circuit elements and the provision of satisfactory synchronizing arrangements.

Although the structure of the elementary size elements and surfaces thereof in the transmitter and receiver take different forms, it will be seen, in accordance with the invention, that equally advantageous results may be obtained by the employment of this invention in either the transmitter or the receiver. It will also be noted that the employment of applicant's invention in the receiver does not necessitate its employment in the transmitter, and likewise the employment at the transmitter does not necessitate its employment at the receiver, but a flexible arrangement is provided.

Having thus described the invention, what is claimed is:

1. A color television system comprising an electron tube having a target based upon a quasi-focal plane adapted to be impacted by an electron beam substantially focused thereat, a multiplicity of substantially elementary size elements having a plurality of surfaces and covering the electron beam impact area of said target, said elementary size elements being discriminative to different selected component colors depending upon the direction of angular interception of said electron beam, electron beam deflection means for causing said beam to scan said target in a predetermined scanning raster, and electron beam bending means positioned adjacent the edges of said target only, to bend said electron beam to select color discrimination in accordance with a predetermined arrangement.

2. A color television system comprising an electron tube having a target adapted to be impacted by an electron beam substantially focused thereat and consisting of a multiplicity of substantially elementary size elements having a plurality of surfaces, said elementary size elements being discriminative to different selected component colors depending upon the direction of angular interception of said electron beam, electron beam deflection means for causing said beam to scan said target in a predetermined scanning raster, and electron beam bending means positioned at the side of said electron beam to bend said electron beam to select color discrimination in accordance with a predetermined arrangement.

3. An electron tube with an electron beam target having a rough surface and adapted to be impacted by an electron beam substantially focused thereat, said target representing identifiable selected component colors depending upon the approach angle of said electron beam to said target, electron beam deflection means for causing said beam to scan said target in a predetermined scanning raster, and electron beam bending means separate from but adjacent to the only outside edges of said target to bend said electron beam to control its approach angle to said target.

4. In a television system, an electron tube having an image target adapted to be impacted by an electron beam substantially focused thereat, a multiplicity of substantially elementary size elements covering the electron beam impact area of said target, said elements being selected component color selective depending upon the direction of impact of said electron beam upon said target, electron beam deflection means for causing said beam to scan said target in a predetermined scanning raster, and electron beam bending means positioned to the side of the path of said electron beam path to bend said electron beam to select color discrimination in accordance with a predetermined arrangement.

5. In a television system, an electron tube having an image target adapted to be impacted by an electron beam substantially focused thereat, a multiplicity of substantially elementary size elements covering the electron beam impact area of said target, said elements being component color responsive depending upon the direction of impact of said electron beam upon said target, electron beam deflection means for causing said beam to scan said target in a predetermined scanning raster, and electrostatic electron beam bending means positioned only at the edges of said target to bend said electron beam to select color discrimination.

6. In a television system, an electron tube having an image target adapted to be impacted by an electron beam substantially focused thereat, a multiplicty of substantially elementary size elements covering the electron beam impact area of said target, said elements being capable of emitting light of different selected component colors depending upon the direction of impact of said electron beam upon said target, electron beam deflection means for causing said beam to scan said target in a predetermined scanning raster, and electromagnetic electron beam bending means positioned outside said electron tube to bend said electron beam to select color discrimination in accordance with a predetermined arrangement.

7. In a television system, an electron tube having an image target adapted to be impacted by an electron beam substantially focused thereat, a multiplicity of substantially elementary size elements covering the electron beam impact area of said target, said elements taking a pyramidal form and having surfaces representative of different selected component colors depending upon the direction of impact of said electron beam upon said target, electron beam deflection means for causing said beam to scan said target in a predetermined scanning raster and electron beam bending means in addition to said deflection means to cause said electron beam to impact selected component color representative elemental surfaces in accordance with a prearranged schedule.

8. In a television system, an electron tube having an image target adapted to be impacted by an electron beam substantially focused thereat, a multiplicity of substantially elementary size elements covering the electron beam impact area of said target, said elements taking a shelf-like form and having surfaces representative of different selected component colors depending upon the direction of impact of said electron beam upon said target, electron beam deflection means for causing said beam to scan said target in a predetermined scanning raster and electron beam bending means in addition to said deflection means to cause said electron beam to impact selected component color representative elemental surfaces in accordance with a prearranged schedule.

9. In a television system, an electron tube having an image target with an irregular surface and adapted to be impacted by an electron beam substantially focused thereat, said target representing identifiable selected component colors depending upon the approach angle of said electron beam to said target, beam scanning means for causing said electron beam to scan said irregular surface, and electron beam bending means posioned at the extremities of said target only and arranged to influence said electron beam at a position between said beam scanning means and said target to control the approach angle of said electron beam to said target.

10. In a television system, an electron tube having an image area target adapted to be impacted by an electron beam substantially focused thereat, said target comprising a multiplicity of coated and color representative impact elements, each having a pluarity of surface areas of a sub-elemental size, said surface coatings of the impact surface areas being formed of a plurality of materials adapted to effect a response under electron impact which closely approximates predetermined colors of a multicolor additive color system and wherein like color representative surfaces are substantially equally inclined with respect to other color representative surfaces, electron beam deflection means for causing said beam to scan said target in a predetermined scanning raster, and electron beam bending means all positioned along side the scanning area of said electron beam to bend said electron beam to intercept a single component color representative group of surfaces.

11. In a television system, an electron tube having an image area target adapted to be impacted by an electron beam substantially focused thereat, said target comprising a multiplicity of coated and color representative impact elements, each having a plurality of surface areas of a sub-elemental size, said surface coatings of the impact surface areas being formed of a plurality of materials adapted to effect a response under electron impact which closely approximates predetermined colors of a multicolor additive color system and wherein like color representative surfaces are substantially equally inclined with respect to the plane of the total target area, electron beam deflection means for causing said beam to scan said target in a predetermined scanning raster, and electron beam bending means along side the scanning area of said electron beam to bend said electron beam along its path two times each time in an opposite direction to intercept a single component color representative group of surfaces.

12. In a television system, an electron tube having an image area target adapted to be impacted by an electron beam substantially focused thereat, said target comprising a multiplicity of coated and color representative impact elements, each having a plurality of surface areas of a sub-elemental size, said surface coatings of the impact surface areas being formed of a plurality of materials adapted to effect a response under electron impact which closely approximates predetermined colors of a multicolor additive color system and wherein like color representative surfaces are substantially equally inclined with respect to the normal plane of the target area, electron beam deflection means for causing said beam to scan said target in a predetermined scanning raster, and electron beam bending means along side the scanning area of said electron beam to double bend said electron beam to intercept a single component color representative group of surfaces.

13. A television transmitting system comprising an electron tube having a light sensitive target adapted to be scanned by a single electron beam, said target consisting of a multiplicity of substantially elementary size elements, each having a plurality of different selected component color light sensitive coated surfaces oriented in a plurality of different directions depending upon their individual component color representation, electron beam bending means for causing said beam to impact said target from a selected direction along the surface of said target to impact chosen component color light sensitive coated surfaces.

14. A television receiving system comprising an electron tube having a color responsive screen adapted to be scanned by a single electron beam, said screen consisting of a multiplicity of substantially elementary size elements, each having a plurality of different selected component color light emitting coated surfaces oriented in a plurality of different directions depending upon their individual component color representation, electron beam bending means for causing said beam to impact said screen from a single direction along the surface of said screen to impact chosen selected component color light emitting coated surfaces depending upon the coincident component color selection.

GEORGE C. SZIKLAI.
ALFRED C. SCHROEDER.

REFERENCES CITED

The following references are of record in the file of this patent:

UNITED STATES PATENTS

| Number | Name | Date |
|---|---|---|
| 2,307,188 | Bedford | Jan. 5, 1943 |
| 2,461,515 | Bronwell | Feb. 15, 1949 |

FOREIGN PATENTS

| Number | Country | Date |
|---|---|---|
| 443,896 | Great Britain | Mar. 10, 1936 |
| 562,168 | Great Britain | June 21, 1944 |